June 19, 1956

P. H. SEWARD 2,751,537

DYNAMIC BRAKING CONTROL

Filed Feb. 25, 1953

INVENTOR
Paul H. Seward
BY
Willits, Helwig & Baillio

United States Patent Office 2,751,537
Patented June 19, 1956

2,751,537

DYNAMIC BRAKING CONTROL

Paul H. Seward, Downers Grove, Ill., assignor to General Motors Corporation, Detroit, Mich., a corporation of Delaware Application February 25, 1953, Serial No. 338,649

16 Claims. (Cl. 318—88)

This invention relates generally to dynamic braking control systems and more particularly to the controls for dynamic braking systems adapted for use on electrically powered railway vehicles.

Dynamic braking control systems, especially for use with electrically powered railway vehicles have, since their inception, received considerable attention from persons well aware of the definite limitations encountered in present day controls for these systems. One reason for this interest has been that up to the present time no simple control has been provided for the operator which allows him to apply increased indicated amounts of dynamic braking without fear of exceeding the safe, permissible maximum amount which otherwise subjects the braking grids and other parts of the system to possible injury or destruction. In other words, while concerted efforts have been made to give the operator a dynamic braking control which is extremely simple to operate and which he may use more or less indiscriminately without fear of exceeding the maximum grid voltages and currents, such efforts up to this time have been relatively unsuccessful.

Another reason for the interest in these controls is found in the problem which arises when railway vehicles are used in multiple and it is desired to control the magnitude of the dynamic braking in the trailing units by means of controls located in the lead unit. While this type of control has been achieved to a certain degree, no really effective means has been found which will assure that the magnitude of dynamic braking applied in the leading unit will be the same as the magnitude of braking applied in each of the trailing units, and that positive control of dynamic braking in all units of a locomotive consist will be available in the lead unit at all times.

It, therefore, becomes an object of this invention to automatically limit the amount of retarding effort that the dynamic braking grids may dissipate in the form of heat in order to keep these grids and the traction motors to which they are connected within safe operating limits.

It is a further object of this invention to control the field excitation of a traction motor armature by controlling the field excitation of a generator across which the field of the motor is connected by connecting voltage sensitive means across a dynamic braking grid connected across the armature of said motor, this voltage sensitive means acting to vary resistive means in electrical circuit with the excitation means for the generator.

It is another object of this invention to provide a simple electrical control for a plurality of dynamic braking systems, each in a separate locomotive unit, all of which may be positively controlled in one of the units to apply an equal amount of braking in all units.

It is a further object of this invention to provide a simple push button control for a dynamic braking system which allows the operator to simply depress one button for decreasing the magnitude of dynamic braking and allows the operator to depress a second button for increasing the amount of dynamic braking, the amount of dynamic braking being readily determined by simple indicating means located in close proximity to the push buttons.

It is another object of this invention to provide a railway vehicle with a dynamic braking push button control including one button which may be depressed to decrease the amount of dynamic braking and a second button which may be used to increase the amount of dynamic braking, but which automatically prevents the operator from increasing the dynamic braking beyond its safe limit even though the operator continues to actuate the increase push button of the dynamic braking control.

It is another object of this invention to provide a push button control for a plurality of railway vehicles utilizing dynamic braking systems, the push button control being operable in one of the railway vehicles to control the magnitude of dynamic braking exerted by the dynamic braking systems in the plurality of railway vehicles.

It is a still further object of this invention to provide an extremely simple push button control for the separate units in a locomotive consist which assures positive control of all units in only one unit, which automatically equalizes the amount of dynamic braking being applied by each unit, which automatically limits the dynamic braking grid voltages and currents in all units to safe operating maximums, and which prevents inadvertent manual application of dynamic braking by personnel on units other than the positive controlling unit.

Other objects and features of this invention will become apparent by reference to the following detailed description and the drawings clearly describing and illustrating the details of this control system, in which.

Figure 1A:
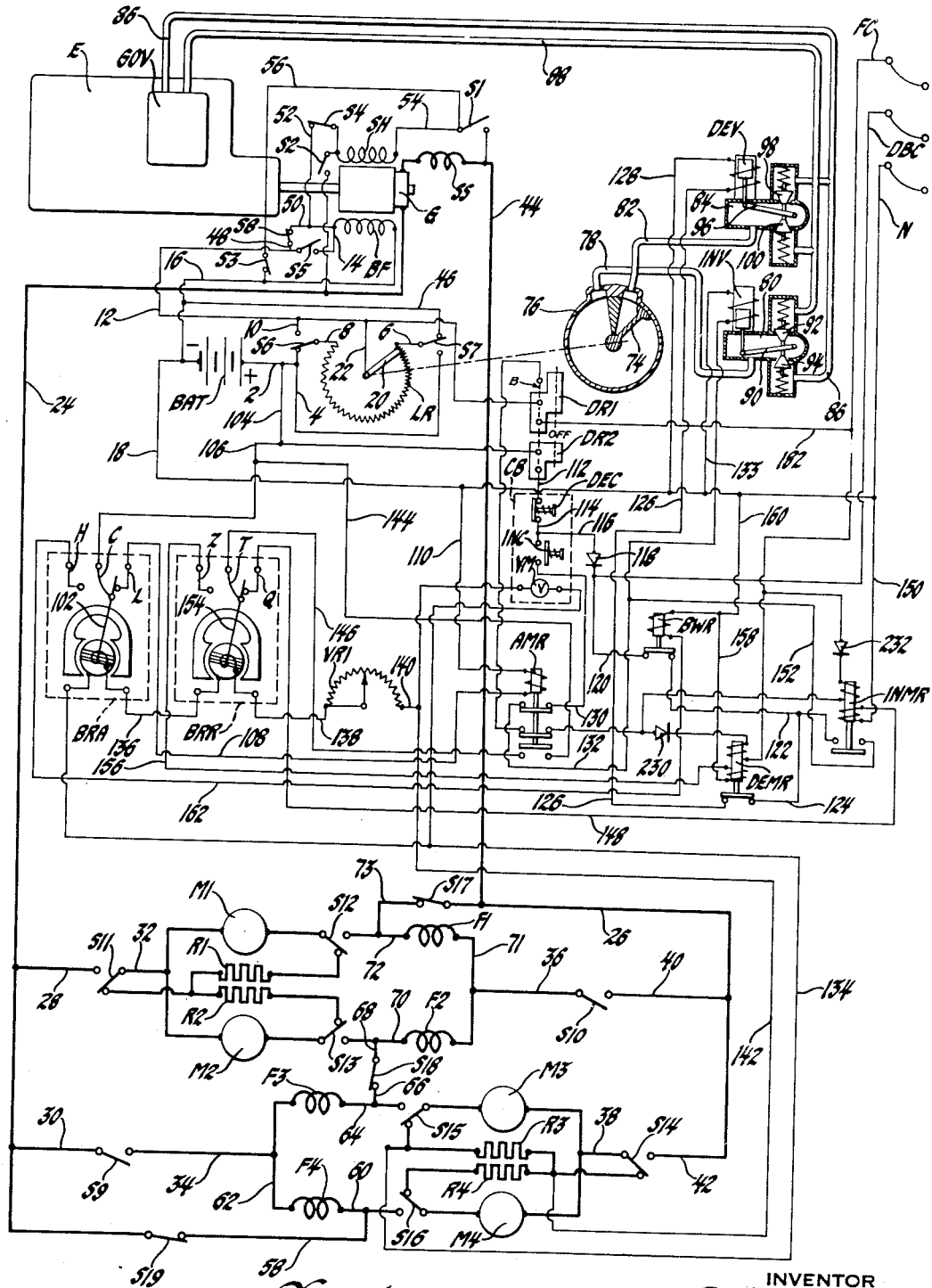
Figure 1A is a diagrammatic drawing of the electrical power and dynamic braking circuits for a diesel electric locomotive with the new electrical control schematically shown electrically connected thereto.

Referring now to Figure 1A, the dynamic braking control system first will be generally described with respect to a single locomotive unit. In Figure 1A a diesel engine E having a governor GOV therefor is shown driving a main generator G. When the locomotive is connected in power, i. e., when the wheels of the locomotive are exerting tractive effort for pulling a train, the generator G is excited by three generator fields. One of these fields is a series field SS which is permanently connected in series across the armature of the generator G. A shunt field SH is also provided which is normally connected in parallel with the generator armature by closure of switches S1 and S2 and opening of switches S3 and S4. A third separately excited field BF is normally connected in series with a battery BAT and a variable resistor LR by closure of switch S5, movement of switches S6 and S7 to positions opposite to the positions in which they are shown, and opening of switch S8. By positioning the switches for the battery field and the load regulator in the manner just described, current would be allowed to flow from the positive side of the battery BAT through a conductor 2, a conductor 4, the switch S7, a conductor 6, the resistance of the variable resistor LR, a conductor 8, the switch S6, a conductor 10, a conductor 12, the switch S5, a conductor 14, the battery field BF, a conductor 16, and a conductor 18 returning to the negative side of the battery BAT. Current could also flow from the positive side of the battery BAT through conductors 2 and 4, switch S7, conductor 6, a portion of the resistance of the variable resistor LR, the resistor wiper arm 20, a conductor 22, the conductor 12, switch S5, conductor 14, battery field BF, and conductors 16 and 18 into the negative side of the battery BAT. From the description of these last two circuits it should be readily appreciated that the magnitude of excitation of the battery field BF will depend on the position of the wiper arm 20 of the variable resistor LR.

In order to propel the locomotive by means of the power delivered by the diesel engine E and the generator G a plurality of traction motors M1, M2, M3 and M4 are provided whose armatures are geared to respective locomotive axle and wheel sets. These motors, along with their respective series fields F1, F2, F3 and F4 may be connected across the armature of the main generator G by closure of switches S9 and S10; movement of switches S11, S12, S13, S14, S15 and S16 to positions opposite to the positions in which they are shown; and opening of the switches S17, S18 and S19. By placing switches S9 through S19 in the positions just described, current may now flow from one side of the generator G through a conductor 24, branch conductors 28 and 30, switches S11 and S9, conductors 32 and 34, the branch circuit for traction motor M1 including the field F1 and the switch S12, the branch circuit for traction motor M2 including its field F2 and the switch S13, the branch circuit for traction motor M3 including its field F3 and the switch S15, the branch circuit for traction motor M4 including its field F4 and the switch S16, conductors 36 and 38, switches S10 and S14, conductors 40 and 42, conductor 26, and conductor 44 returning to the other side of the generator G. During power operation of the locomotive the wiper arm 20 of the variable resistor LR is controlled in a well known manner by the governor GOV and a vane motor 76 (later to be described) to cause the power output of the generator to conform with the power output of the diesel engine E for each throttle position of the diesel engine and over the entire range of locomotive speeds.

Now, if it should become necessary or desirable to utilize the dynamic brakes for braking the locomotive, the switches S1 through S19 are all moved to the positions shown in the schematic diagram of Figure 1A. It will be appreciated that the switches S1 through S19 may be manually moved to the positions shown although in fact these switches are operated electrically in a well known way which need not further be described here since the manner of operating these switches forms no part of the present invention. With the switches S1 through S19 placed in the positions shown in the diagram of Figure 1A the shunt field SH is disconnected from the power circuit and connected in additive parallel relationship with the battery field BF, the parallel connections of these two fields being connected in series relationship with the battery BAT and the variable resistor LR. It will be noted, however, that switches S6 and S7, when placed in the positions shown, electrically reverse the variable resistor LR in circuit with the battery field BF and the battery BAT. The purpose of this is to utilize the small bar to bar increments of resistance for current change at high locomotive speeds when minimum excitation is required. These small current changes prevent "hunting" of the variable resistor LR when automatic current limiting is provided in a manner to be fully described later in this specification.

Returning now to the schematic of Figure 1A, it will be observed that with the variable resistor connected in the manner just described and fields BF and SH connected in additive relationship, current may now flow from the positive side of the battery BAT through conductors 2 and 4, the switch S6, conductor 8, the resistance of the variable resistor regulator LR in the direction of decreasing bar increments of resistance, conductor 6, switch S7, conductor 46 and conductors 16 and 18 returning to the negative side of the battery BAT. Current may also flow from the positive side of the battery BAT through conductors 2 and 4, switch S6, conductor 8, a portion of the resistance of the variable resistor LR in the direction of decreasing bar increments of resistance, the wiper arm 20, conductors 22 and 12, a conductor 48, switch S8, a conductor 50, from where the current branches into two circuits, one containing the battery field BF and conductors 16 and 18 returning to the negative side of the battery BAT, the other branch including a conductor 52, the switch S4, the shunt field SH, a conductor 54, a conductor 56, switch S3 and conductors 16 and 18 returning to the negative side of the battery BAT. With switches S11 through S16 in the positions shown, dynamic braking resistor grids R1, R2, R3 and R4 are connected across the armatures of traction motors M1, M2, M3 and M4 respectively. In order to provide excitation for the traction motor armatures having the dynamic braking grids connected thereacross the fields for the traction motors are connected in series across the armature of the main generator G by having the switches S9, S10, S17, S18 and S19 placed in the positions shown. This positioning of these last mentioned switches will allow current to flow from one side of the generator G through the conductor 24, switch S19, a conductor 58, a conductor 60, the field F4, a conductor 62, the field F3, a conductor 64, a conductor 66, switch S18, a conductor 68, a conductor 70, field F2, a conductor 71, field F1, a conductor 72, a conductor 73, switch S17, conductor 26, and conductor 44 back to the other side of the generator G. With the switches S1 through S19 connected in the manner shown and just described, the dynamic braking power circuits of the locomotive, the variable resistor LR, the battery field BF and the shunt field SH are all connected in proper relation for dynamic braking.

The manually operated and automatic current limiting features of the low voltage control for this dynamic braking system will now be described. A pair of drum switches DR1 and DR2 are moved from the off to the B or braking position. The lower of these switches, namely switch DR2, connects the positive side of the battery BAT to a dynamic braking control box CB which is provided with a push button DEC for decreasing the amount of dynamic braking, a push button INC for increasing the amount of dynamic braking and a volt meter VM for indicating the magnitude of dynamic braking.

Mechanically or otherwise suitably coupled to the wiper arm of the variable resistor LR is a vane 74 of the vane motor 76. Clockwise and counterclockwise movement of the vane 74 due to the coupling diagrammatically shown, also causes corresponding clockwise and counterclockwise movement of the wiper arm 20 of the variable resistor LR. One side of the vane motor 76 is connected by means of a fluid conduit 78 to a hydraulic magnet valve 80. The other side of the vane motor 76 is connected by means of a fluid conduit 82 to a similar hydraulic magnet valve 84. The hydraulic magnet valves 80 and 84 are solenoid operated to at times connect opposite sides of the vane motor 76 to a fluid conduit 86 supplying oil pressure from the engine governor GOV. The hydraulic magnet valves 80 and 84 are also solenoid operated to at times connect opposite sides of the hydraulic vane motor 76 to a return line 88 which allows oil to return to the engine governor GOV.

The hydraulic magnet valve 80 comprises a solenoid INV operating a valve lever 90. As the valve lever 90 moves up it unseats a valve 92 and seats a valve 94. Likewise, as the lever 90 moves down it seats the valve 92 and unseats the valve 94. Movement of the valve 94 to its unseated position allows the conduit 78 to communicate with conduit 86, thereby supplying oil under pressure to one side of the vane 74. When the valve 92 is unseated it allows the oil on one side of the vane 74 to return to the governor. The hydraulic magnet valve 84 is similar to the hydraulic magnet valve 80 and comprises a solenoid DEV operating a lever 96 to seat and unseat the valves 98 and 100. It may be appreciated that by having the solenoids INV and DEV energized and de-energized in different combinations the vane 74 of vane motor 76 may be held stationary, or made to move clockwise or counterclockwise.

Referring now to the center and lower portion of Diagram 1A it will be noted that a pair of sensitive voltage relays BRA and BRR are connected in series with each other across the armature of the traction motor M3 and its dynamic braking resistor grid R3. Also connected across the armature M3 and the grid R3 and in parallel with these two voltage sensitive relays is the suitably calibrated volt meter VM. Connected in series with the relays BRA and BRR is a variable resistor VR1 which may be varied to properly adjust the operating voltages of the relays BRA and BRR. The voltage relay BRA has a swinging arm 102 which moves in response to voltage, much like the indicating arm of the standard volt meter, and in fact the construction of the relay BRA is essentially like that of the standard volt meter and therefore needs no further description here. It should be mentioned, however, that in operation of relay BRA its contacts C to L open at a certain predetermined voltage after which the C contact remains open until another substantially higher predetermined voltage is reached. Upon reaching this higher predetermined voltage the contacts C to H of the relay BRA close. Relay BRR is of the same type as relay BRA, but is adjusted to have its contacts T to Q open at a predetermined voltage which is greater than the voltage at which the C to L contacts of the BRA relay open. The T contact of the BRR relay will then remain open until a predetermined higher voltage is achieved, at which time contacts T to Z of the BRR relay close. Closure of the T to Z contacts of the BRR relay, however, takes place at a voltage lower than the voltage at which the C to H contacts of the BRA relay are closed.

A relay AMR is shown provided with an operating coil which is normally energized when the locomotive is operating in dynamic braking, thereby maintaining the upper and middle interlocks normally closed and the lower interlock normally open. A relay BWR is also shown whose operating coil is normally deenergized and whose interlock is normally closed. A relay DEMR is provided with a pair of normally deenergized operating windings and a normally closed interlock. A fourth relay INMR is also provided with a pair of normally deenergized operating windings and a normally open interlock.

Manual operation of the dynamic braking control in combination with its automatic resistor grid current limiting feature will now be described. With the drum switches DR1 and DR2 in the B or braking position, and switches S1 through S19 in the positions shown on the diagram, current may flow from the positive side of the battery BAT through the conductor 2, a conductor 104, a conductor 106, the C to L contacts of the voltage sensitive relay BRA, a conductor 108, the operating coil of the AMR relay, a conductor 110 and the negative return conductor 18 leading to the negative side of the battery BAT. The circuit just described energizes the coil of the AMR relay and maintains its interlocks in the positions shown. Current may also flow from the positive side of the battery through the conductor 2, conductor 106, the closed contacts of the drum switch DR2, a conductor 112, the closed contacts of the push button DEC, conductor 114, conductor 116, a rectifier 118, conductor 120, the normally closed interlock of the relay BWR, conductor 122, conductor 124, the closed interlock of the DEMR relay, conductor 126, the operating coil of the solenoid DEV, conductor 128, and conductor 18 returning to the negative side of the battery BAT. The circuit just described energizes the DEV solenoid, which seats the valve 100 and unseats the valve 98 to allow oil from the governor to be supplied to the right side of the vane motor 76. In normal operation the DEV solenoid is in the position shown to allow oil pressure to be supplied to the right side of the vane motor 76. The solenoid INV of the magnet valve 80, however, is normally in the position shown, i. e., with coil of INV solenoid deenergized to maintain valve 92 seated and valve 94 unseated, thereby allowing oil to be supplied to the left side of the vane motor 76. With solenoid DEV energized and solenoid INV deenergized, governor oil pressure is applied to each side of the vane 74, thereby maintaining it in a steady or non-moving position. Now, if the operator wishes to increase the amount of dynamic braking he may do so by depressing the push button INC. When the push button INC is depressed current may flow from the positive side of the battery BAT through conductors 2 and 106, the closed contacts of the drum switch DR2, the closed contacts of the push button DEC, conductor 114, the now closed contacts of the INC push button, a conductor 130, the upper closed interlock of the energized AMR relay, conductor 132, the operating coil of the INV solenoid, and conductor 134 to the negative return conductor 18. This last described circuit energizes the hydraulic magnet valve 80 to unseat the valve 92 and seat the valve 94, thereby disconnecting the conductor 78 leading from one side of the vane motor 76 from the oil pressure supply line 86 and connecting the conductor 78 to the oil return line 88. In other words, energization of the hydraulic magnet valve 80 as well as hydraulic magnet valve 84 causes the vane 74 of the vane motor 76 to move clockwise thereby decreasing the amount of resistance of the variable resistance LR in circuit with the shunt field SH and the battery field BF. Reduction of the resistance in series with the shunt and battery fields and the battery BAT increases the excitation of the generator G and its power output. Increasing the power output of the generator G increases the excitation of the traction motor fields F1 through F4 and the current flow through the resistor grids R1, R2, R3 and R4, and consequently the magnitude of dynamic braking being applied. If the operator wishes to decrease the amount of dynamic braking as observed on the volt meter indicator VM, he will depress the push button DEC until the desired reduction is achieved. By depressing the button DEC current may no longer flow from the positive side of the battery BAT to the DEV solenoid as described above, nor is any current able to flow through the coil of the INV solenoid. In other words, both the hydraulic magnet valve 80 and the hydraulic magnet valve 84 are deenergized. With hydraulic magnet valve 84 deenergized oil may flow from the right side of the vane motor 76 through the fluid conduit 82 past the unseated valve 100 into the governor return line 88, and, as already described, when the hydraulic magnet valve 80 is deenergized, hydraulic fluid will be supplied to the left-hand side of the vane motor 76. With the vane motor 76 having hydraulic fluid supplied to its left-hand side and having hydraulic fluid exhausted from its right-hand side the vane 74 will move counterclockwise, thereby increasing the amount of resistance in circuit with the battery and the shunt fields BF and SH. By increasing the amount of resistance of the variable resistor LR in circuit with the shunt and battery fields the power output of the generator is reduced as is the field excitation of the traction motors, thereby decreasing the amount of dynamic braking being applied.

It will now be appreciated that a dynamic braking control has been described whose manual operation is of the utmost simplicity. The operator merely has to depress an increase button until the desired magnitude of dynamic braking is achieved as observed on the volt meter indicator which is readily before him. If the operator desires to decrease the amount of dynamic braking he merely depresses a second button and holds it down until the proper reduction has been achieved as observed on the volt meter indicator VM. Due to the series relationship of the interlocks of the decrease button DEC and the increase button INC, if the operator should accidently depress both buttons the dynamic braking will merely be decreased. If, however, the operator should depress only the increase button INC and continually hold it down so that maximum dynamic braking is achieved, the automatic current limiting feature of the dynamic braking control will take over. Operation of this current limiting feature will now be described.

As the current and the voltage through the various dynamic braking grids R1, R2, R3 and R4 builds up because the resistance in series with the excitation means for the generator is being constantly reduced, a portion of this increased current will flow from one side of the resistor grid R3 through the voltage sensitive relays BRA and BRR by means of a conductor 134, a conductor 136, conductor 138, variable resistor VR1, conductor 140, and a conductor 142 returning to the other side of the resistor grid R3. As soon as the voltage across the resistor grid R3 builds up to a sufficient amount, the contact arm 102 of the relay BRA will move to the left thereby opening the contacts C to L. Opening of contacts C to L interrupts the energizing circuit for the AMR relay and allows it to drop to its lower position, thereby opening its upper and middle interlocks and closing its lower interlock. Opening of the upper interlock of the AMR relay prevents the operator from further increasing the amount of dynamic braking by depressing the INC button since energization of the INV solenoid by means of the INC button depends upon the upper interlock of the AMR relay being closed as described above. Closure of the lower interlock of the AMR relay now allows current to flow from the positive side of the battery BAT through conductors 2, 104, 106, a conductor 144, the now closed lower interlock of the AMR relay, a conductor 146, the T to Q contacts of the BRR relay, a conductor 148, the lower operating coil of the INMR relay, and a conductor 150 to the negative return conductor 18. Energization of the INMR relay closes its interlock and allows current to flow from the positive side of the battery through conductors 2, 104, 106, the closed contacts of the drum switch DR2, conductor 112, the closed contacts of the push button DEC, conductors 114 and 116, a rectifier 118, conductor 120, the normally closed interlock of the relay BWR, conductor 122, the now closed interlock of the INMR relay, a conductor 152, the conductor 132, the energizing coil of the INV solenoid, conductor 133 and negative conductor 18 returning to the negative side of the battery BAT. This last mentioned circuit automatically causes the dynamic braking to increase until the voltage across the braking resistor grid R3 becomes great enough to cause the swinging arm 154 of the BRR relay to move slightly counterclockwise, thereby opening the T to Q contacts of the BRR relay. Opening of the T to Q contacts of the BRR relay deenergizes the lower coil of the INMR relay preventing further energization of the INV solenoid thereby preventing any further increase in dynamic braking by reducing the amount of resistance in circuit with the battery and shunt fields of generator G. Now, if for some reason, i. e., a change in locomotive speed, the voltage across the braking resistor R3 should increase still further, the swinging arm 154 of the voltage relay BRR will move all the way to the left, thereby closing the T to Z contacts of the BRR relay. Closure of the T to Z contacts completes a circuit which energizes the lower operating coil of the DEMR relay. The circuit energizing the lower coil of the DEMR relay includes the conductor 2 leading from the positive side of the battery BAT, conductors 104, 106 and 144, the now closed lower interlock of the AMR relay, conductor 146, the now closed T to Z contacts of the BRR relay, a conductor 156, lower coil of the DEMR relay, a conductor 158, a conductor 160, and the negative return conductor 18. Energization of the lower coil of the DEMR relay causes its interlock to open, thereby opening the circuit energizing the DEV solenoid. With both the DEV and the INV solenoids deenergized, the vane 74 of the vane motor 76 will move in a counterclockwise direction as heretofore described, thereby increasing the amount of resistance in circuit with the generator fields BF and SH. As stated, increasing this resistance will decrease the amount of dynamic braking and the voltage across the resistor R3 until the contacts T to Z of the BRR relay again open by movement of the swinging arm 154 to the right. Open of the T to Z contacts of relay BRR deenergizes the lower coil of the DEMR relay allowing its interlock to close, thereby reenergizing the DEV solenoid to cause the vane 74 and the variable resistor LR to again assume a steady state.

Now, if for some reason after the T to Z contacts of the BRR relay have been closed, the DEMR relay fails to deenergize the DEV solenoid so as to reduce the amount of dynamic braking, the voltage across the resistor grid R3 may continue to increase. When the voltage reaches a predetermined maximum amount, the C to H contacts of the BRA relay will be closed, thereby closing a circuit which energizes the winding of the BWR relay. The coil of the BWR relay will be energized by current flowing from the positive side of the battery through conductors 2, 104, 106, the now closed contacts C to H of the BRA relay, conductor 162, the coil of the BWR relay, conductor 160 to the negative return conductor 18. Energization of the operating coil of the BWR relay opens its interlock to prevent any energization of either the DEV or the INV solenoids. Deenergization of both DEV and INV solenoids, as already described, will cause the vane 74 of the vane motor 76 and the wiper arm 20 of the variable resistor LR to move counterclockwise thereby reducing generator excitation and traction motor excitation until the C to H contacts of the BRA relay and the T to Z contacts of the BRR relay are opened.

It may now be appreciated that the voltage and the current flow through the resistor grids R1, R2, R3 and R4 has been automatically controlled in a very unique manner to prevent them from exceeding a predetermined maximum which might otherwise injure the resistor grids and other parts of the braking system. Even if the operator continues to depress the increase button INC he will be unable to increase these braking resistor currents and voltages beyond safe predetermined maximums since, upon reaching a certain predetermined voltage the manual operating control is automatically disconnected and the automatic control takes over.

Figure 1B:
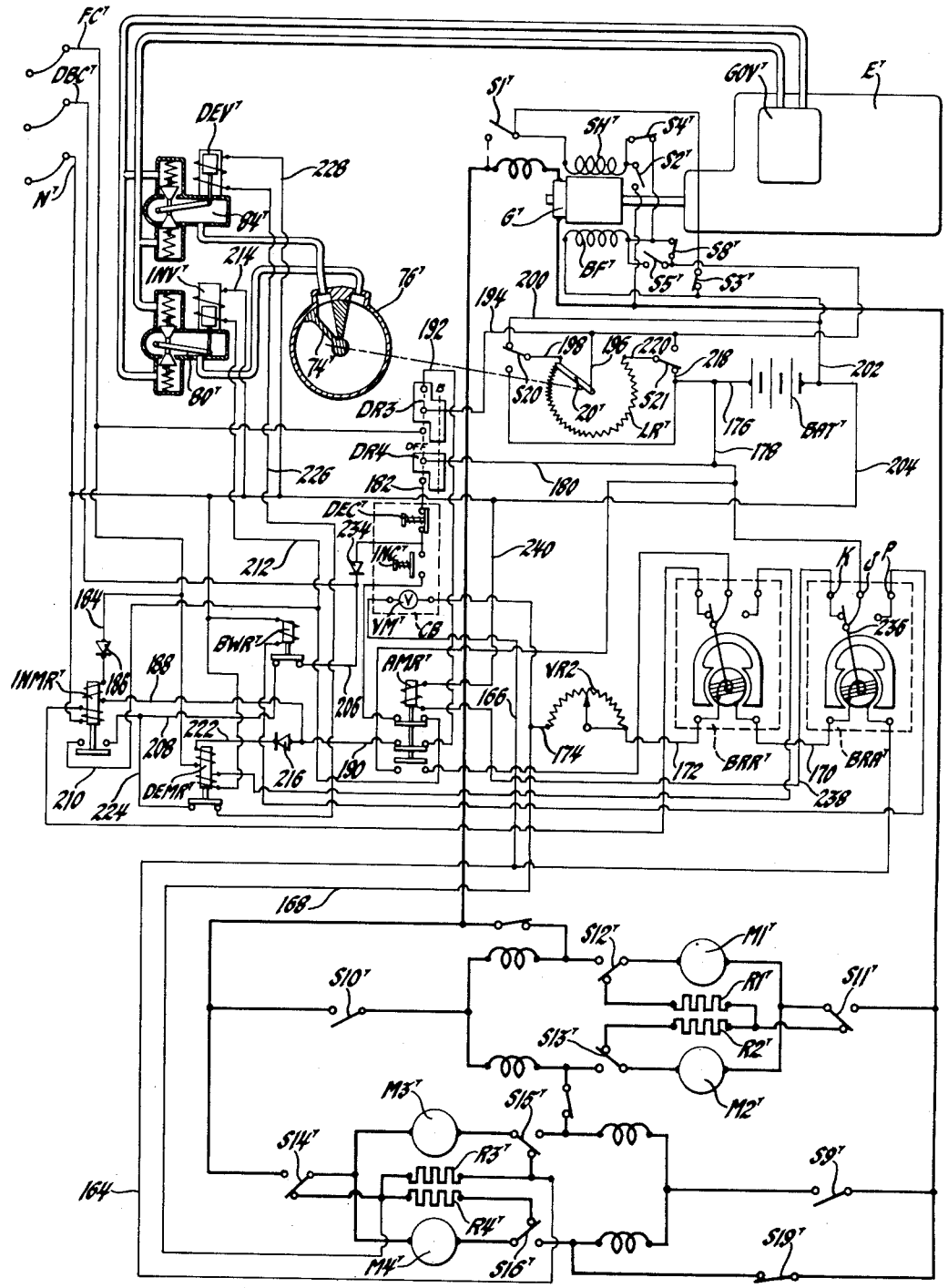
Figure 1B is similar to Figure 1A except that the electrical circuits of the control system shown in Figure 1B have been connected in different combinations by means of the drum switches shown thereon to act as a trailing unit which may be controlled by the dynamic braking control in a lead unit, exemplified in Figure 1A.

Referring now to both Figure 1A and Figure 1B the manner of controlling the dynamic braking for a plurality of units by means of controls operated only in the leading unit will be explained. The schematic shown in Figure 1B is similar to that shown in Figure 1A except that the low voltage controls are connected in a somewhat different manner by means of drum braking switches DR3 and DR4 which, in Figure 1B, are left in the off position. In other words, the main difference between the controls in Figure 1A and Figure 1B is that in Figure 1A the drum braking switches DR3 and DR4 are shown in the braking or B position, whereas in Figure 1B the drum brake switches DR3 and DR4 are shown in the off position. Since the heavy power circuits, including the generator G' and the traction motors M1' through M4' with their respective braking grids R1' through R4' all shown in Figure 1B, are exactly the same as generator motors and grids in the leading unit shown in Figure 1A, no further description need be given with respect to them. The switches S10' through S19' serve the same function in the trailing unit as switches S10 through S19 serve in the lead unit. In a similar manner switches S1' through S5' and switch S8' serve the same function in the trailing unit that switches S1 through S5 and switch S8 serve in the lead unit. Likewise, switch S20 and switch S21 serve the same function in the trailing unit that switches S6 and S7 serve in the lead unit.

Referring for a moment to Figure 1A, three train lines FC, DBC and N are shown coupled to three train lines FC', DBC' and N' on the trailing unit shown in Figure 1B. The low voltage control circuit in Figure 1B has a similar vane motor 76' and similar hydraulic magnet valves 80' and 84'. Coupled to the vane motor 76' is the variable resistor LR' having a wiper arm 20'. The generator G' is driven by a diesel engine E' provided with the governor GOV'. Excitation of the generator G' in the trailing unit is accomplished by using shunt field SH' and the battery field BF' and connecting them in parallel with each other and in series with the variable resistor LR' and a battery BAT'. A dynamic braking control box CB' is provided on the trailing unit having the decrease push button control DEC' and the increase push button control INC'. A volt meter VM' is also located on the dynamic braking control box and is connected across the dynamic braking grid R3' of the armature of traction motor M3' by means of conductors 164, 166 and 168. Also connected in series across the braking resistor R3' by means of conductors 164, 170, 172, variable resistor VR2, conductor 174 and conductor 168 are a pair of sensitive voltage relays BRA' and BRR'. The relays in the trailing unit are similar to those in the lead unit and comprise a relay AMR', a relay INMR', a relay DEMR' and a relay BWR'.

Now, with the lead unit in Figure 1A coupled to the trailing unit in Figure 1B by means of the train lines FC—FC', DBC—DBC' and N—N' and with the drum switches DR1 and DR2 of the lead unit in the B or braking position, and the drum switches DR3 and DR4 of the trailing unit in the off position, the operation of the multiple control is as follows: In the trailing unit, leaving the drum switch DR4 in the off position disconnects one side of the dynamic braking control box CB' from the positive side of the battery BAT'. This may be observed by starting from the positive side of the battery BAT' and following conductors 176, 178 and 180 to one of the contacts of the drum switch DR4. As shown, the other contact of the drum switch DR4 is disconnected therefrom preventing any flow of current into the conductor 182 and the contacts of the push button control DEC', etc. By isolating the control box CB' from the battery BAT' in the trailing unit, no dynamic braking can be inadvertently applied by anyone on the trailing unit who might depress the decrease push button DEC' or the increase push button INC'. In other words, this leaves any manual dynamic braking control in the lead unit. Now, assuming that it is desired to achieve a certain amount of dynamic braking in both the lead and trailing units, the operator will depress the increase button INC on the control box CB of the lead unit. This will increase the amount of dynamic braking in the lead unit, in a manner previously described, by moving the wiper arm 20 clockwise to decrease the amount of resistance in electrical circuit with the generator fields SH and BF. Assume now that the movement of the wiper arm 20 will place less resistance in electrical circuit with the excitation fields for the generator G in the lead unit than the resistance position of the wiper arm 20' has already placed in electrical circuit with the generator fields SH' and BF' in the trailing unit. This will make the voltage drop across the variable resistor LR' greater than that across the variable resistor LR and will impress a voltage across the INMR' and DEMR' relays in the trailing unit. Thus, current will flow from the positive side of the battery BAT in the lead unit through conductors 2 and 4, switch S6, conductor 8, part of the resistance of the variable resistor LR, wiper arm 20, conductor 22, conductor 12, the closed middle and lower contacts of the drum switch DR1, a conductor 182, the train lines FC—FC', a conductor 184, a rectifier 186, the upper coil of the INMR' relay, a conductor 188, conductor 190, the normally closed middle interlock of the AMR' relay, a conductor 192, the upper and middle closed contacts of the drum switch DR3, a conductor 194, conductor 196, the wiper arm 20', a portion of resistance of variable resistor LR', a conductor 198, switch S20, a conductor 200, conductor 202, a negative return conductor 204, negative train lines N'—N, negative return conductor 18, to the negative side of the battery BAT in the lead unit. As mentioned, this circuit energizes the upper coil of the INMR' relay in the trailing unit causing its interlock to close. Closure of the INMR' interlock will now allow current to flow from the positive side of the battery BAT in the lead unit through conductors 2, 104 and 106, the closed contacts of the drum switch DR2, conductor 112, the closed contacts of the push button control DEC, conductor 116, rectifier 118, conductor 120, the train lines DBC—DBC', a conductor 206, the normally closed interlock of the relay BWR', a conductor 208, the now closed interlock of the INMR' relay, a conductor 210, conductor 212, the coil of the increase solenoid on the hydraulic magnet valve 80', and a conductor 214 leading to the negative return conductor 204, train lines N'—N and the negative return conductor 18 returning to the negative side of the battery BAT in the lead unit. Energization of the increase solenoid of the hydraulic magnet valve 80' will cause the vane 74' of the vane motor 76' to move counterclockwise until the resistance of the resistor LR' in series with the generator excitation fields SH' and BF' is the same as the resistance of the variable resistor LR in circuit with the fields in the lead unit and a voltage is no longer impressed across the operating coils of the INMR' and DEMR' relays. It will be noted that under the conditions first assumed, while current may flow from the lead unit through the upper coil of the INMR' relay, no current can flow through the upper coil of the DEMR' relay which is conected in parallel therewith due to the presence of a rectifier 216. If, however, the reverse conditions are assumed, i. e., the resistance of the load regulator LR in circuit with the battery field SH and BF is greater than the resistance of the variable resistor LR' in circuit with the fields SH' and BF', then current will flow from the positive side of the battery BAT' in the trailing unit in a similar manner to energize the upper coil of the DEMR' relay on the trailing unit, the upper coil of the INMR' relay remaining deenergized because of the rectifier 186. The flow of current energizing the upper coil of the DEMR' relay may be traced out by starting from the positive side of the battery BAT' in the trailing unit following through the conductor 176, a conductor 218, a switch S21, conductor 220, a portion of the resistance of the variable resistor LR', wiper arm 20', conductors 196 and 194, closed upper and middle contacts of drum switch DR3, conductor 192, the normally closed middle interlock of the relay AMR', a conductor 190, the rectifier 216, a conductor 222, the upper coil of the DEMR' relay, FC'—FC train lines, conductor 182, closed contacts of the drum switch DR1, conductors 12 and 22, a wiper arm 20, a portion of the resistance of the variable resistor LR, conductor 6, switch S7, conductors 46 and 16 to the negative return conductors 18, N—N', and 204. Energization of the upper coil of the DEMR' relay opens its interlock, thereby breaking a circuit which had been energizing the solenoid of the hydraulic magnet valve 84'. The circuit which normally maintained the hydraulic magnet valve 84' energized comprised the positive side of the battery BAT in the lead unit, conductors 2, 104 and 106, the closed contacts of the drum switch DR2, a conductor 112, closed contacts of the push button DEC, conductors 114 and 116, the rectifier 118, train lines DBC—DBC', the conductor 206, the closed interlock of the BWR' relay, the conductor 208, a conductor 224, the normally closed interlock of the DEMR' relay, a conductor 226, the operating coil of the DEV' solenoid and a conductor 228 to the negative return conductors 204, N'—N, and 18. Deenergization of the hydraulic magnet valve 84' by opening of the interlock of the DEMR' relay as just explained, will cause the vane 74' of the vane motor 76' in the trailing unit to move clockwise until the wiper arm 20' of the variable resistor LR' increases the resistance in circuit with the generator exciting fields SH' and BF' to balance the resistance of the variable resistor LR on the lead unit in circuit with the exciting fields SH and BF.

It will be noted that the lead unit is provided with a rectifier 118 which prevents any current flow from the trailing unit through the train lines DBC'—DBC from entering the control box CB on the lead unit. The purpose of the rectifier 118 is to assure positive manual control in the lead unit at all times.

It should be mentioned that the lead unit in Figure 1A could be converted into a trailing unit simply by moving the drum switches DR1 and DR2 to the off position. Movement of these switches would isolate the manual control box CB in a manner described with respect to the manual control box CB' on the trailing unit, shown in Figure 1B. Movement of the drum switches DR1 and DR2 likewise would bring the upper coils of the DEMR and INMR relays into play as explained with respect to the upper coils of the relays DEMR' and INMR' on the trailing unit shown in Figure 1B. The rectifiers 230 and 232 on the unit shown in Figure 1A would then act to polarize the upper coils of the DEMR and the INMR relays as explained with respect to the unit shown in Figure 1B.

Likewise, the trailing unit shown in Figure 1B can be made to operate as a lead unit by moving the drum switches DR3 and DR4 to the B or braking position. Movement of the switch DR4 to the braking position will give positive control to the control box CB'. Movement of the drum switch DR3 to the braking position will isolate the upper coils of the DEMR' and the INMR' relays to make them inoperative when the control in Figure 1B is being used for a lead unit. In such case, the unit shown in Figure 1B is also provided with a rectifier which will prevent any current flow through the train lines DBC—DBC' from the trailing unit into the dynamic braking control box CB' thereby assuring positive control in the unit shown in Figure 1B when acting as a lead unit.

The current limiting features of the unit shown in Figure 1B operate in the same manner as the current limiting features of the unit shown in Figure 1A which has been previously explained. It should be mentioned, however, that when the unit shown in Figure 1B is operating as a trailing unit and the current limiting feature on the trailing unit comes into play, the manual control on the lead unit will be isolated from the trailing unit as follows: When the voltage across the resistor R3' reaches and exceeds a predetermined amount, the swinging arm 236 of the BRA' relay will move to the right, opening the J to K contacts of the BRA' relay. Opening these contacts deenergizes the operating coil of the AMR' relay causing its upper and middle interlocks to open and its lower interlock to close. This will become apparent when it is realized that the coil of the AMR' relay is normally energized by current flowing from the positive side of the battery BAT' through conductors 176, 178, 180, the contacts J to K of the BRA' relay, a conductor 238, the coil of the AMR' relay, and a conductor 240 leading to the negative return conductor 204. When the AMR' relay is deenergized by opening of the J to K contacts of the BRA' relay, as already mentioned, the middle interlock of the AMR' relay is opened. Opening of the middle interlock of the AMR' relay opens the circuit including the upper coils of the INMR' and DEMR' relays thereby preventing any current flow in either direction through these coils. This will of course prevent any further manual control of the trailing unit by the push button controls in the lead unit, and the automatic grid current limiting control of the trailing unit in Figure 1B will take over in the manner described with respect to the automatic current control shown in Figure 1A.

I claim:

1. A dynamic braking control system for a railway vehicle comprising a generator having separate excitation means therefor in electrical circuit with a voltage source, variable resistive means in electrical circuit with said separate excitation means and said voltage source for varying the excitation of said generator, a hydraulic motor having a vane operable to vary said resistive means, electrically operated valve means effective to apply and relieve hydraulic pressure on opposite sides of the vane of said motor, an electrical traction motor having an armature rotatable by the momentum of said vehicle and excitation means therefor in electrical circuit with the armature of said generator, a dynamic braking resistor connected across the armature of said traction motor, and voltage sensitive means connected across said dynamic braking resistor responsive to predetermined voltages impressed across said resistor to control the energization of said electrically operated valve means and excitation of said generator and said traction motor to automatically regulate the current flow in said resistor within safe operating limits.

2. A dynamic braking control system for a railway vehicle comprising a generator, separate excitation means for said generator including a pair of exciting windings connected in parallel additive relationship with a voltage source, variable resistive means connected in electrical series relationship with said voltage source and said separately excited windings, a hydraulic motor having a movable vane operably connected to said variable resistive means, electrically operated valve means for applying and relieving hydraulic pressure on opposite sides of said vane, an electrical traction motor having an armature rotatable by the momentum of said vehicle and excitation means therefor in electrical circuit with the armature of said generator, a dynamic braking resistor connected across the armature of said traction motor, and voltage sensitive means connected across said dynamic braking resistor responsive to predetermined voltages impressed across said resistor to control the excitation varying means and excitation of said generator and said traction motor to automatically regulate the current flow in said resistor within said safe operating limits, said voltage sensitive means including a pair of voltage sensitive relays connected in electrical series relationship across said dynamic braking resistor, one of said relays having a plurality of contacts in electrical circuit relationship with said voltage source and said electrically operated valve means operable when said relay responds to a predetermined voltage impressed across said resistor to prevent the application of hydraulic pressure to said vane in a manner tending to increase the excitation of said generator and said motor.

3. A dynamic braking control system for a diesel electric locomotive comprising a generator, a separately excited field winding for said generator in electrical circuit with a voltage source, variable resistive means in electrical circuit with said voltage source and said separately excited field winding, a hydraulically operated vane motor having a vane operatively connected to said variable resistive means, a hydraulic pressure source, a first electrically operated valve means for allowing hydraulic pressure from said hydraulic pressure source to be applied to one side of said vane and alternately relieving hydraulic pressure on the other side of said vane, a second electrically operated valve means for allowing hydraulic pressure from said hydraulic pressure source to be applied to the other side of said vane and alternately relieving hydraulic pressure on the one side of said vane, an electrical traction motor having an armature rotatable by the momentum of said vehicle and excitation means therefor in electrical circuit with the armature of said generator, a dynamic braking resistor connected across the armature of said traction motor, voltage sensitive relay means connected across said dynamic braking resistor responsive to predetermined voltages impressed across said resistor, said voltage sensitive relay means including a pair of contacts operable to energize a circuit including said voltage source and said second electrically operated valve means to energize said second valve means to relieve hydraulic pressure on the one side of said vane to increase the excitation of said generator and said traction motor and the current flow through said braking resistor.

4. A dynamic braking control system for a railway vehicle comprising a generator having excitation means therefor, a variable resistor in electrical circuit with said excitation means, a hydraulic vane motor operably connected to said variable resistive means, a hydraulic pressure source, electrically operated valve means effective to connect opposite sides of said vane motor with said hydraulic pressure source, a second electrically operated valve means effective to relieve hydraulic pressure on opposite sides of said vane motor, an electrical traction motor having an armature rotatable by the momentum of said vehicle and excitation means therefor in electrical circuit with the armature of said generator, a dynamic braking resistor connected across the armature of said traction motor, and voltage sensitive means connected across said dynamic braking resistor responsive to predetermined voltages impressed across said resistor to control the operation of said electrically operated valve means to vary the excitation of said generator and said traction motor to automatically regulate the current flow in said resistor within safe operating limits.

5. A dynamic braking system for an electrically powered railway vehicle comprising a generator having a separately excited field winding and a shunt field winding, resistive means in electrical circuit with said separately excited field winding effective to control excitation of said separately excited field winding and the power output of said generator, an electrical traction motor having an armature operatively connected to a traction wheel set to at times drive said wheel set and at times be driven thereby, a dynamic braking resistor, switching means effective when said motor armature is being driven by said wheel set to disconnect said shunt field winding from said generator and connect said shunt field winding in parallel additive relationship with said separately excited field winding to assist separate excitation of said generator and in combination with said resistive means assist in the control thereof, said motor switching means being effective when said motor armature is being driven by said wheel set to disconnect said motor armature from said generator and connect said braking resistor across said motor armature, switching means effective when said motor armature is being driven by said wheel set to connect said motor field across the armature of said generator for excitation thereby, and voltage sensitive means responsive to a predetermined voltage impressed across said dynamic braking resistor effective at predetermined voltages to regulate said variable resistive means and the excitation of said generator and said motor to thereby maintain the current flow through said resistor within safe operating limits.

6. A dynamic braking system for railway vehicles comprising a generator having a separately excited and a shunt field winding, variable resistive means in electrical circuit with said separately excited field winding effective to control excitation of said separately excited field winding and power output of said generator, an electrical traction motor having an armature operably connected to a traction wheel set to at times drive said wheel set and at times be driven thereby, motor switching means effective when said armature is operably connected to a traction wheel set to drive said wheel set to connect said traction motor armature and an exciting field for said motor to said generator for power operation thereof, a dynamic braking resistor, switching means effective when said motor armature is being driven by said wheel set to disconnect said shunt field winding from said generator and connect said shunt field winding in parallel additive relationship with said separately excited field winding to assist separate excitation of said generator and in combination with said resistive means assist in the control thereof, said motor switching means being effective when said motor armature is being driven by said wheel set to disconnect said motor armature from said generator and connect said braking resistor across said motor armature, switching means effective when said motor armature is being driven by said wheel set to connect said motor field across the armature of said generator for excitation thereby, switching means effective when said motor armature is being driven by said wheel set to reverse the electrical connections of said variable resistive means and connect said variable resistive means in series electrical circuit relationship with a voltage source and shunt field winding and said separately excited field winding when these field windings are connected in parallel additive relationship, a hydraulic vane motor having a vane operatively connected to said resistive means, a high hydraulic pressure source and a low hydraulic pressure source, a first electrically operated two-way valve effective to alternately connect one side of said vane and said vane motor to said high and low hydraulic pressure sources, a second electrically operated two-way valve effective to alternately connect the other side of said vane motor and said vane to said high and low hydraulic pressure sources, and voltage sensitive relay means responsive to predetermined voltages impressed across said dynamic braking resistor and effective at predetermined voltages to regulate said variable resistive means to adjust the excitation of said generator and said motor to maintain the current in said braking resistor within safe operating limits, said voltage sensitive relay means including relay means electrically connected across said dynamic braking resistor, a pair of contacts effective at a predetermined voltage to energize the second of said electrically operated valves to connect the other side of said vane to said low hydraulic pressure source to cause movement of said vane to vary said resistive means and increase the excitation of said generator and said motor to increase the magnitude of dynamic braking effort being applied by said system, a second pair of contacts on said voltage sensitive means operable at a predetermined higher voltage operable to deenergize the circuit including said second electrically operated two-way valve to connect said high hydraulic pressure source to both sides of said vane and said vane motor to prevent movement of said vane and said variable resistive means, and another pair of contacts on said sensitive relay means operable at an even higher predetermined voltage than said last mentioned voltage to energize said first electrically operated two-way valve to connect the other side of said vane motor to said low hydraulic pressure source to move said vane and said variable resistive means to decrease the excitation of said generator and said traction motor to reduce the current flow in said dynamic braking resistor to a safe operating maximum.

7. A dynamic braking control system for a railway vehicle comprising a generator having excitation means therefor, variable resistive means in electrical circuit with said excitation means and operable to vary the excitation of said generator, a hydraulic vane motor operably connected to said variable resistive means, a hydraulic pressure source, electrically operated valve means for connecting said vane motor to said hydraulic pressure source, said vane motor when connected to said source being operable to vary said resistive means, and push button control means having contacts in electrical circuit with said electrically operated valve means effective when depressed to control the application of hydraulic pressure to said hydraulic vane motor to control the variation of said resistive means and the excitation of said generator and said field to thereby control the magnitude of dynamic braking being applied by said dynamic braking system.

8. A dynamic braking control system for a railway vehicle comprising a generator having excitation means and excitation varying means therefor, an electrical traction motor having an armature rotatable by the momentum of said vehicle and excitation means therefor in electrical circuit with the armature of said generator, a dynamic braking resistor connected across the armature of said traction motor, manually operated means connected to said excitation varying means to vary the excitation of said generator and said motor to regulate the magnitude of dynamic braking effort being applied for given locomotive speeds, and voltage sensitive means responsive to a predetermined voltage impressed across said resistor below the voltage which provides the resistor with a safe operating maximum current to simultaneously render ineffective said manually operated means and actuate said excitation varying means to increase the current flow through said resistor to said safe operating maximum.

9. A dynamic braking control system for a railway vehicle comprising a generator, a separately excited field for said generator in electrical circuit with a voltage source, variable resistive means in electrical circuit with said voltage source and said field for varying the excitation of said generator, electrically operated hydraulic means operatively connected to said excitation varying means to vary the excitation of said generator, an electrical traction motor having an armature rotatable by the momentum of said vehicle and excitation means therefor in electrical circuit with the armature of said generator, a dynamic braking resistor connected across the armature of said traction motor, manually operated push button means connected to the electrical portion of said electrically operated hydraulic means and effective when depressed to electrically control movement of said hydraulic means and the variable resistive means operatively connected thereto to vary the excitation of said generator and said motor to regulate the magnitude of dynamic braking effort being applied for given locomotive speeds, and voltage sensitive means connected across said dynamic braking resistor responsive to progressively increasing predetermined voltages impressed across said resistor to simultaneously render ineffective said manually operated push button means and regulate said excitation varying means to control the current flow through said resistor within safe operating limits, said voltage sensitive means including relay means connected across said resistor, contacts on said relay means in electrical circuit with said manual control means and said electrically operated hydraulic means operable at a predetermined voltage to prevent excitation of said electrically operated hydraulic means by said manually operated push button means, said relay means including a plurality of other contacts in electrical circuit with said electrically operated hydraulic means effective at predetermined voltages to automatically energize said hydraulic means and regulate said variable resistive means to vary the excitation of said generator and said traction motor and automatically control the current flow through said resistor within safe operating limits.

10. A dynamic braking control comprising a plurality of dynamic braking systems; each system including a main generator having excitation means and excitation varying means therefor, an electrical traction motor having an armature rotatable by the momentum of a vehicle carrying said system, excitation means for said motor in electrical circuit with the armature of said generator, and a dynamic braking resistor connected across the armature of said traction motor; a manually operated control means connected to the excitation varying means of one of said systems to vary the excitation of the generator and the motor in the one of said systems to regulate the magnitude of dynamic braking effort being applied by the one of said systems; means electrically connecting the excitation varying means of said plurality of systems; and polarized voltage sensitive means on the other of said plurality of systems responsive to differences in the voltages impressed across the excitation varying means in the one of said systems and the other of said systems to regulate the excitation varying means in the other of said systems to equalize the magnitude of dynamic braking effort being applied in the other of said systems with the dynamic braking effort being applied by the one of said systems.

11. A dynamic braking control comprising a plurality of railway vehicle dynamic braking systems; each system including a main generator having a separately excited field in electrical circuit with a voltage source, variable resistive means in electrical circuit with said voltage source and said field for varying the excitation of said generator, an electrical traction motor having an armature rotatable by the movement of the vehicle carrying said system, excitation means for said motor in electrical circuit with the armature of said generator, and a dynamic braking resistor connected across the armature of said traction motor; a manually operated control means connected to the variable resistive means of one of said systems and manually operable to vary the variable resistive means and excitation of the generator and the traction motor in the one of said systems to regulate the magnitude of dynamic braking effort being applied by the one of said systems, means electrically connecting the variable resistive means of said plurality of said systems; and polarized voltage sensitive means on the other of said plurality of systems responsive to differences in the voltages impressed across the variable resistive means in the one of said systems and the other of said systems to regulate the variable resistive means in the other of said systems to equalize the magnitude of dynamic braking effort being applied in the other of said systems with the dynamic braking effort being applied by the one of said systems to thereby manually control the dynamic braking effort being applied in all of said systems by means of the manual controls of one of said systems.

12. A dynamic braking control for a plurality of railway vehicle units each having a dynamic braking system comprising a main generator having excitation and excitation varying means therefor, a traction motor armature adapted to be rotated by the momentum of its respective unit, a dynamic braking resistor connected across said armature, excitation means for said motor armature in electrical circuit with the armature of said generator, and electrically operated hydraulic means mechanically coupled to said excitation varying means for controlling the excitation of said generator and said traction motor, said dynamic braking control system having polarized means in one of said dynamic braking systems responsive to differences between the voltages impressed across the excitation varying means in the one of said systems and the voltages impressed across the excitation varying means in another of said dynamic braking systems to vary the excitation means in the other of said dynamic braking systems to thereby equalize the magnitude of dynamic braking effort being applied in both of said systems.

13. A dynamic braking control for a plurality of railway vehicle units each having a dynamic braking system comprising a main generator having excitation means therefor, a traction motor armature rotatable by the momentum of its respective unit, a dynamic braking grid connected across said traction motor armature, excitation means for said traction motor armature in electrical circuit with said generator, a voltage source and variable resistive means in electrical circuit with the excitation means for said generator, voltage sensitive means responsive to predetermined voltages impressed across said dynamic braking grid to automatically control the current in said dynamic braking grid within safe operating limits; said control including polarized means in one of said systems responsive to the setting of the variable resistive means in another of said systems to vary the variable resistive means in the one of said systems to adjust the power output of the generator in the one of said systems to the same magnitude of power output of the generator of the other of said systems to thereby provide the same magnitude of dynamic braking effort for each of said systems, the voltage sensitive means in the one of said systems having relay means responsive to progressively increasing predetermined voltages impressed across the resistor in the one of said systems to simultaneously render ineffective said polarized means and automatically regulate the excitation varying means in the one of said systems to control the current flow through the resistor of the one of said systems within safe operating maximum limits.

14. A dynamic braking control system for a railway vehicle comprising a generator having excitation means and excitation varying means therefor, an electrical traction motor having an armature rotatable by the momentum of said vehicle and excitation means therefor in electrical circuit with the armature of said generator, a dynamic braking resistor connected across the armature of said motor, manually operated means connected to said excitation varying means to vary the excitation of said generator and said motor to thereby regulate the magnitude of dynamic braking effort being applied for given locomotive speeds, and means responsive to a current in said resistor below a predetermined maximum operating current for said resistor to render said manually operated means inoperative.

15. A dynamic braking control system for a railway vehicle comprising a generator having excitation means and excitation varying means therefor, an electrical traction motor having an armature rotatable by the momentum of said vehicle and excitation means therefor in electrical circuit with the armature of said generator, a dynamic braking resistor connected across the armature of said motor, manually operated means connected to said excitation varying means to vary the excitation of said generator and said motor to thereby regulate the magnitude of dynamic braking effort being applied for given locomotive speeds, and means responsive to a current in said resistor below a predetermined maximum operating current for said resistor to render said manually operated means inoperative and to automatically increase the current in said resistor to said predetermined maximum operating current.

16. A dynamic braking control system for a railway vehicle comprising a generator having excitation means and excitation varying means therefor, an electrical traction motor having an armature rotatable by the momentum of said vehicle and excitation means therefor in electrical circuit with the armature of said generator, a dynamic braking resistor connected across the armature of said motor, manually operated means connected to said excitation varying means to vary the excitation of said generator and said motor to thereby regulate the magnitude of dynamic braking effort being applied for given locomotive speeds, means responsive to a current in said resistor below a predetermined maximum operating current for said resistor to render said manually operated means inoperative and to automatically increase the current in said resistor to said predetermined maximum operating current, said means being responsive to current in said resistor above said predetermined maximum operating current to reduce the current in said resistor to said predetermined maximum operating current.

References Cited in the file of this patent

UNITED STATES PATENTS

| Number | Name | Date |
|---|---|---|
| 2,624,029 | Lillquist | Dec. 30, 1952 |
| 2,627,597 | Johansson | Feb. 3, 1953 |
| 2,629,058 | Lillquist | Feb. 17, 1953 |